United States Patent

[11] 3,599,096

| [72] | Inventors | Jon C. Stemples<br>Coral Gables;<br>Samuel R. Everett, Ft. Lauderdale, both of, Fla. |
|---|---|---|
| [21] | Appl. No. | 792,177 |
| [22] | Filed | Jan. 17, 1969 |
| [45] | Patented | Aug. 10, 1971 |
| [73] | Assignee | The Bendix Corporation |

[54] INFINITE RESOLUTION MULTIPLE VOLTAGE WINDOW COMPARATOR
7 Claims, 1 Drawing Fig.

[52] U.S. Cl. .................................................. 324/140,
323/8, 328/147
[51] Int. Cl. ........................................................ G01r 17/00
[50] Field of Search .......................................... 324/140;
307/304, 296, 229; 323/94, 8; 328/147

[56] References Cited
UNITED STATES PATENTS
2,870,406  1/1959  Smith ........................... 324/140 X
3,341,816  9/1967  Davis et al. ..................... 328/147 X

OTHER REFERENCES

Electronics World Article by D. E. Lancaster; Oct. 1967; pp. 30, 31 and 78.

*Primary Examiner*—Alfred E. Smith
*Attorneys*—Plante, Arens, Hartz, Hix and Smith, Bruce L. Lamb, William G. Christoforo and Lester L. Hallacher ABSTRACT: Each comparator of a plurality of comparators receives as one input one of a plurality of voltages sampled from intermediate points in a resistor string which is fed by a constant current source. Each comparator also receives as a second input as unknown voltage. The sampled voltages define voltage windows with an output signal being generated when the unknown voltage falls within one or the other of the windows. A window level voltage is impressed at an intermediate point in the resistor's string. Variation of the window level voltage causes the voltage windows to be translated along a voltage magnitude scale.

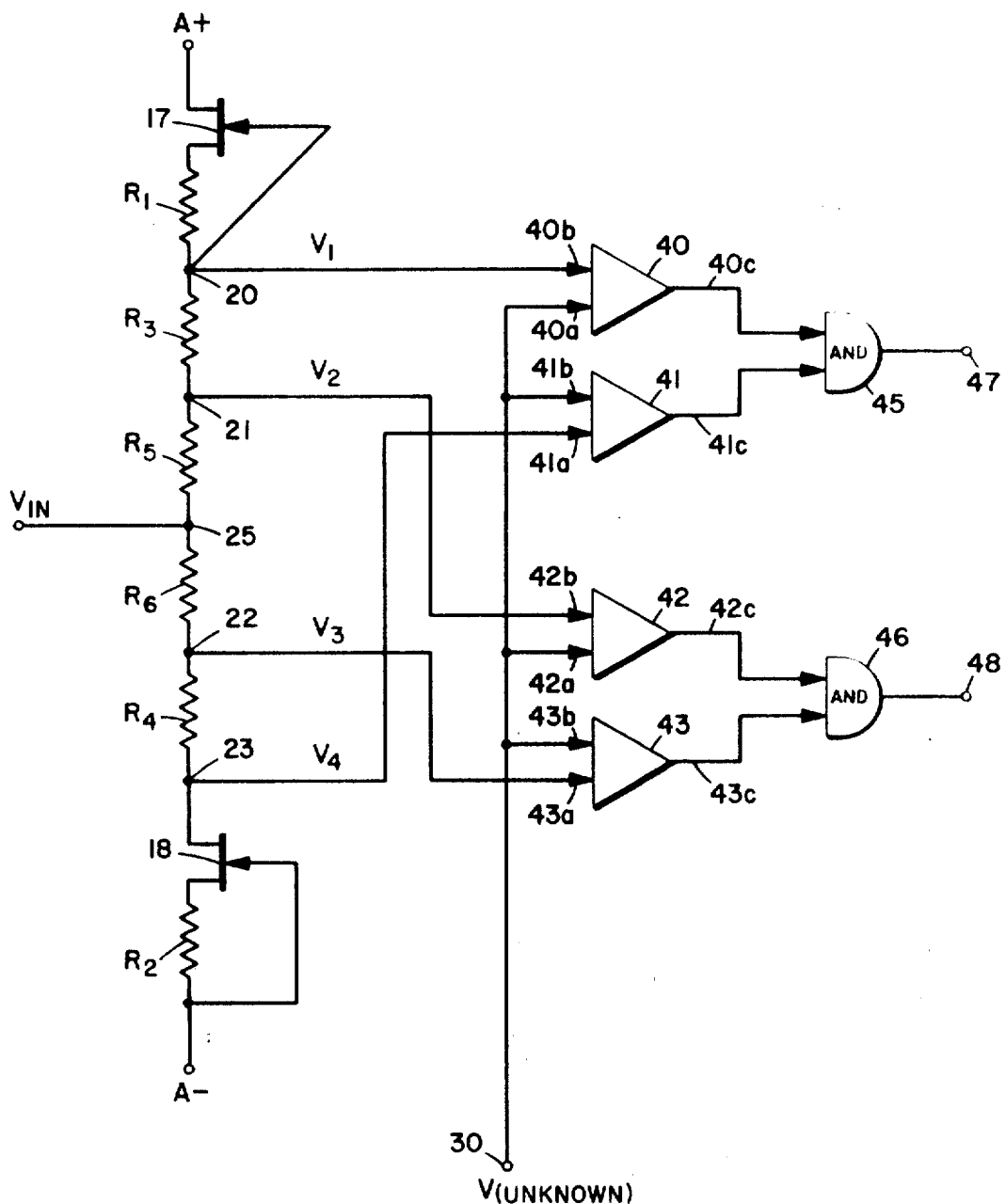
JON C. STEMPLES
SAMUEL R. EVERETT
INVENTORS
BY William G. Christoforo
ATTORNEY

3,599,096

INFINITE RESOLUTION MULTIPLE VOLTAGE WINDOW COMPARATOR

BACKGROUND OF THE INVENTION

This invention relates to voltage comparators and more particularly to means for determining whether an unknown voltage lies within a given voltage band (window) where the voltage bandwidth and the absolute level of the band midpoint can be varied.

Voltage comparators are well known and generally comprise a circuit which compares one voltage level with another and generates an output signal whenever one voltage level, usually an unknown voltage level, exceeds another, usually a reference voltage level. For some comparator applications the reference voltage level is varied within the limits of the comparator so that the unknown voltage level is now compared to a reference voltage level which is changing in a known manner.

Except for the above relationship, the comparator output signal is usually independent of the voltage level inputs, that is, there is no interest in reproducing as comparator output signal any part of the comparator inputs. For example, the comparator output signal may consist of an abrupt shift from one predetermined quiescent level to another at the instant the proper comparison is recognized and remains there until the proper comparison is no longer recognized.

By using multiple comparators, each of which has applied thereto a different reference voltage level along with the unknown voltage level, one or more voltage windows are produced and defined by the reference voltage levels. The comparator means thus produced will indicate the general location of the unknown voltage level, either within or without the voltage window. This type of comparator means is useful, of course, in determining whether an unknown voltage level lies within a predetermined voltage band.

In known proximity warning indicator systems for aircraft wherein it is desired to know at a protected aircraft whether an intruder aircraft within the immediate vicinity is close enough in altitude to constitute a collision hazard, each aircraft on a regular, predetermined schedule broadcasts information as to its altitude. A receiver in each aircraft receives the broadcast and converts the received altitude information into a voltage proportional to the intruder altitude. The intruder altitude voltage is now compared with a voltage window whose average level is proportional to the protected-aircraft's altitude and whose width is proportional to a band of altitudes within which an intruder would be considered to constitute threat for the protected aircraft. Notice that it is not necessary to determine the absolute value of the intruder altitude (voltage) but only whether the intruder altitude is within a predetermined altitude (voltage) band about the protected aircraft. Of course, as the altitude of the intruder aircraft varies the intruder altitude voltage will vary. As the altitude of the protected aircraft changes, the average altitude band voltage must change.

For the above and similar applications it is necessary to have a voltage comparator means to determine whether an unknown voltage lies within a voltage band about a reference voltage level where the reference voltage level is changing.

It is thus an object of this invention to provide a comparator means for generating a signal output whenever an unknown voltage level lies within a predetermined voltage window.

It is another object of this invention to provide a comparator means for generating a signal output whenever an unknown voltage level lies within a predetermined voltage window, the average value of the voltage window being determined by a reference voltage level.

Another object of this invention is to provide a comparator means of the type described wherein the reference voltage level is varying.

One more object of this invention is to provide a comparator means of the type described where a translation of the voltage window will not effect the width thereof.

These and other objects of the invention will become apparent to one skilled in the art by a reading and understanding of the nature, principles, and details of the invention as disclosed herein.

SUMMARY OF THE INVENTION

The invention, briefly, comprises a plurality of comparator elements which have high-impedance input ports. Each comparator receives as one input an unknown voltage level which it is desired to identify. A string of resistors, serially connected, are fed by a constant current source and has impressed at an approximate midpoint thereof the reference voltage. It will be later explained how this reference voltage sets the level of a resultant voltage window and for that reason may be referred to as a window level voltage. Points intermediate of the resistor's string are connected to one input of each of the comparator elements as a secondary reference in such a way as to define the desired voltage windows. Subsequent shifting of the reference voltage will cause the voltages at the aforementioned resistor string intermediate points to shift in the same direction and by the same amount. Since, as explained above, the voltage at these intermediate points comprise the secondary reference voltages, the resultant voltage windows are likewise shifted without changing the width thereof.

It is possible by changing the magnitude of the current flowing through the resistor string or by changing the resistance values of the individual resistors therein to additionally change the voltage window width as desired.

BRIEF DESCRIPTION OF THE DRAWINGS

The FIGURE is a schematic of the invention.

DESCRIPTION OF THE PREFERRED EMBODIMENT

Referring to the FIGURE there is seen a resistor string comprised of resistors $R_1$, $R_2$, $R_3$, $R_4$, $R_5$ and $R_6$ serially connected with one another and with field effect transistors 17 and 18 and connected between voltage sources A+ and A−. Field effect transistor 17 along with Resistor $R_1$ as well as field effect transistor 18 along with resistor $R_2$ comprise constant current sources which feed a constant current to the resistor string so that voltages $V_1$, $V_2$, $V_3$ and $V_4$ appear at resistor string intermediate points 20, 21, 22 and 23, respectively.

A plurality of comparator elements, in this specific embodiment, four comparator elements 40—43, of any of the known types, comprise the logical circuitry of the invention. Each comparator element includes one high-voltage, high-input impedance port each, for example, ports 40a, 41a, 42a and 43a and one low-voltage high-input impedance port each, for example, ports 40b, 41b, 42b and 43b. A comparator element will generate an output signal at its output terminal for example, terminal 40c, 41c, 42c or 43c, whenever the voltage at its high-voltage input port is less than the voltage at its low-voltage input port.

An unknown voltage which it is desired to recognize is applied to terminal 30 and thence to comparator elements high-voltage input ports 40a and 42a and comparator elements low-voltage input ports 41b and 43b.

A primary reference voltage $V_{jx}$ previously designated a window level voltage in that it determines the voltage level of the comparator means voltage window, is applied at intermediate point 25 of the resistor string. Voltages $V_1$, $V_2$, $V_3$ and $V_4$, which can be termed secondary reference voltage levels in that they define the end limits of the voltage windows, are applied to the comparator elements as follows. $V_1$ is applied to low-voltage input port 40b. $V_2$ is applied to low-voltage input port 42b. $V_3$ is applied to high-voltage input port 43a and $V_4$ is applied to high-voltage input port 41a.

As previously stated, the input ports of the comparator elements have a characteristically high-input impedance, and negligible current is drawn therethrough, hence negligible current is drawn out of the resistor string thereby, so that the current $i_1$) through each element of the resistor string is essentially equal to the current drawn by all other elements of the resistor string, regardless of the value of $V_{IN}$. Thus, the following relationships prevail:

$$V_1 = V_{IN} + I_1(R_3 + R_5) \quad (1)$$
$$V_2 = V_{IN} + i_1 R_5 \quad (2)$$
$$V_3 = V_{IN} - i_1 R_6 \quad (3)$$
$$V_4 = V_{IN} - i_1(R_6 + R_4) \quad (4)$$

From the above relationships it should be obvious that a variation in $V_{IN}$ causes an identical variation (in the same direction and by the same amount) in $V_1$, $V_2$, $V_3$ and $V_4$, assuming, as is the case here, that the current through the various resistors comprising the resistor string remains constant. Additionally, for the embodiment here shown:

$$V_1 > V_2 > V_{IN} > V_3 > V_4$$

where $V_1$, $V_4$ and $V_2$, $V_3$ define the limits of the desired voltage windows.

It should now be noted that the comparator element output terminals 40c and 41c are connected to the inputs of AND gate 45, while comparator element output terminals 42c and 43c are connected to the inputs of AND gate 46. It should also be remembered that a comparator element generates an output signal whenever the voltage at its high-voltage input port is less than the voltage at its low-voltage input port. Accordingly, an output signal appears at gate 45 output terminal 47 whenever:

$V_1 > V(\text{unknown}) > V_4$ that is, whenever the unknown voltage lies between $V_1$ and $V_4$. Additionally, an output appears at gate 46 output terminal 48 whenever:

$V_2 > V(\text{unknown}) > V_3$ that is, whenever the unknown voltage lies between $V_2$ and $V_3$. Thus, $V_1$ and $V_4$ define one voltage window which includes $V_{IN}$, while $V_2$ and $V_3$ define another but smaller window which also includes $V_{IN}$. For use in an aircraft proximity warning indicator system, for example, the voltage window defined by $V_2$ and $V_3$ will comprise an altitude voltage window about the protected-aircraft altitude, which is defined by $V_{IN}$ within which an intruder would be considered a collision threat, while the voltage window defined by $V_1$ and $V_4$ will define a larger altitude window about the protected aircraft's altitude. An intruder without the window defined by $V_2$ and $V_3$ but within the window defined by $V_1$ and $V_4$ is considered to be a possible collision threat.

Reconsidering equations (1), (2), (3) and (4) it should be noted that the voltage windows can be widened or narrowed as a group by increasing or decreasing $i_1$ respectively, by any one of the known means while the voltage windows can be varied individually in width by varying the applicable resistance value. Of course, if $V_{IN}$ alone is varied the width of each voltage window will remain constant.

Although we have specifically shown how our invention can be used in one particular application, i.e., a proximity warning indicator system, it should be obvious that our teachings can be used by one skilled in the art to solve other similar problems without departing from our teachings. Accordingly, not wishing to be limited to the specific embodiment shown herein we hereby claim as our invention the subject matter including modifications and alterations thereof encompassed by the true scope and spirit of the appended claims.

The invention we claim is:

1. A voltage comparator means comprising:
   a source of a primary voltage reference;
   a constant current source;
   a resistor string serially connected with said constant current source and having a plurality of intermediate points, said primary reference voltage source being connected to one of said intermediate points and secondary reference voltages being tapped from other of said intermediate points;
   a source of unknown voltage; and,
   a plurality of voltage comparator elements, having high-impedance input ports, each said element receiving as one input one said secondary voltage reference and receiving as a second input said unknown voltage, each of said comparator elements for generating an output signal when a predetermined of said inputs exceeds the other of said inputs.

2. The voltage comparator means as recited in claim 1 wherein said constant current source comprises:
   a DC voltage source; and,
   field effect transistor means having drain source circuits and gate electrodes, said source drain circuits being connected serially with said resistor string and said gate electrodes being connected to predetermined points in said resistor string.

3. A voltage comparator means as recited in claim 1 wherein an even number of said secondary voltage references are generated, said primary reference voltage being applied to said resistor string at a first point, one-half of said secondary reference voltages being tapped from intermediate points above said first point and the other half of said secondary reference voltages being tapped from intermediate points below said first point.

4. A voltage comparator means as recited in claim 3 wherein said secondary reference voltages comprise a plurality of voltages from a highest voltage to a lowest voltage in steps.

5. A voltage comparator means as recited in claim 3 wherein one comparator element is provided for each secondary reference voltage, a first said comparator element receiving as one input a relatively high of said secondary reference voltages and a second said comparator element receiving as one input a relatively low of said second reference voltages, and with additionally:
   first gating means receiving the outputs of said first and second comparator elements for generating a first signal output whenever said unknown voltage lies within the window defined by said relatively high and said relatively low secondary reference voltages, said first and second comparator elements and said first gating means comprising a first window comparator.

6. A voltage comparator means as recited in claim 4 wherein one comparator element is provided for each secondary reference voltage, a first said comparator element receiving as one input the highest of said secondary reference voltages and a second said comparator element receiving as one input the lowest of said secondary reference voltages, and with additionally:
   first gating means receiving the outputs of said first and second comparator elements for generating a first signal output whenever said unknown voltage lies within the voltage window defined by said highest and lowest secondary reference voltages, said first and second comparator elements and said first gating means comprising a first window comparator.

7. The voltage comparator means as recited in claim 6 with additionally other window comparators wherein each said window comparator comprises:
   a third comparator element receiving as one input thereof a secondary reference voltage tapped from said resistor string a predetermined number of intermediate points above said primary reference voltage;
   a fourth comparator element receiving as one input thereof a secondary reference voltage tapped from said resistor string the same number of intermediate points below said primary reference voltage; and,
   second gating means receiving the outputs of said third and fourth comparator elements for generating a second signal output whenever said unknown voltage lies within the window defined by said third and fourth secondary reference voltages.